United States Patent [19]

Davis

[11] 3,753,750

[45] Aug. 21, 1973

[54] PROTECTING GRAIN IN STORAGE AREAS BY AN OXYCHLORIDE CEMENTITIOUS COMPOSITION

[75] Inventor: Harvey J. Davis, Springfield, Mo.

[73] Assignee: M & D Enterprises, Inc., Springfield, Mo.

[22] Filed: Sept. 28, 1970

[21] Appl. No.: 76,130

[52] U.S. Cl. .................................. 106/106, 106/107
[51] Int. Cl. .............................................. C04b 7/00
[58] Field of Search................... 106/106, 107, 105, 106/108; 98/55; 52/192–198

[56] References Cited
UNITED STATES PATENTS

| | | | |
|---|---|---|---|
| 1,078,845 | 11/1913 | Fraass | 106/107 |
| 1,524,664 | 2/1925 | Liddell | 106/107 |

Primary Examiner—James E. Poer
Attorney—Fishburn, Gold & Litman

[57] ABSTRACT

Protecting grain in storage areas by providing wall structures defining grain storage areas with an oxychloride cementitious composition formed by mixing dry magnesium chloride, magnesium oxide, asbestos, a particle waterproofing agent, granular material, and a mineral filler with sufficient water to form a plastic cementitious composition to be formed into walls for storage areas or placed on existing walls of extisting grain storage areas with the composition and walls thereof being rigid when cured. The composition is characterized by having sufficient porosity to permit air movement therethrough and thereby prevent formation of condensation resulting from rapid temperature drop outside the storage area and the composition inhibits growth of mold.

3 Claims, 3 Drawing Figures

PATENTED AUG 21 1973　　　　　　　　　　3,753,750

INVENTOR.
Harvey J. Davis
BY
Fichtum, Gold & Lotman
ATTORNEYS

PROTECTING GRAIN IN STORAGE AREAS BY AN OXYCHLORIDE CEMENTITIOUS COMPOSITION

The present invention relates to protection of grain in storage areas and more particularly to a composition to form wall structures for grain storage areas or a coating on walls of existing areas. The composition of this invention is an oxychloride cementitious composition which has particular application for forming or coating wall structures to enclose grains, such as corn and the like, wherein chemical salts in the composition inhibit growth of mold. Walls formed of the composition are porous and have a breathing action which prevents formation of condensation thereon and on grain adjacent thereto.

Oxychloride cements have many favorable characteristics, such as for decorative treatment of walls, however, the general reputation of oxychloride cements has been that they would not withstand the elements during outside usage due to absorption of water with the resulting deterioration.

The principal objects of the present invention are: to provide an oxychloride cementitious composition and a method of protecting grain in storage areas by providing wall structures for a crib or bin for storage of grains, such as corn or the like, wherein the cementitious composition is applied to an existing structure, such as a corn crib, or applied to materials to form a corn crib or the like wherein the composition is characterized by having sufficient porosity to permit air movement therethrough and thereby prevent formation of condensation resulting from rapid temperature drops outside the storage area; to provide such a composition for wall structures wherein the chemical composition thereof is such as to prevent the formation of mold or other organic growth thereon or on grain stored in an area defined by the walls; to provide such a composition for wall structures which is sufficiently porous to permit a breathing action thereby substantially eliminating the formation of condensation on the wall structure and stored material adjacent and in contact therewith; to provide such an oxychloride cementitious composition which is extremely versatile wherein the composition may be applied over any suitable reinforcing material, existing wall material or the like; to provide such a cementitious composition for wall construction which is extremely durable wherein the wall structure has a balanced flexibility and hardness and the wall structure has a substantial water repellance; to to provide such a composition having a high bonding strength to an existing wall or to reinforcing material to form a wall structure; and to provide such an oxychloride cementitious composition and application thereof to form a wall structure for protecting grain in storage areas wherein the composition is economical to manufacture, easy and economical to install, adapted to be applied substantially the year around to thereby avoid construction delays, and particularly well adapted for the proposed use.

Other objects and advantages of this invention will become apparent from the following description taken in connection with the accompanying drawings wherein are set forth by way of illustration and example, certain embodiments of this invention.

Figure 1:
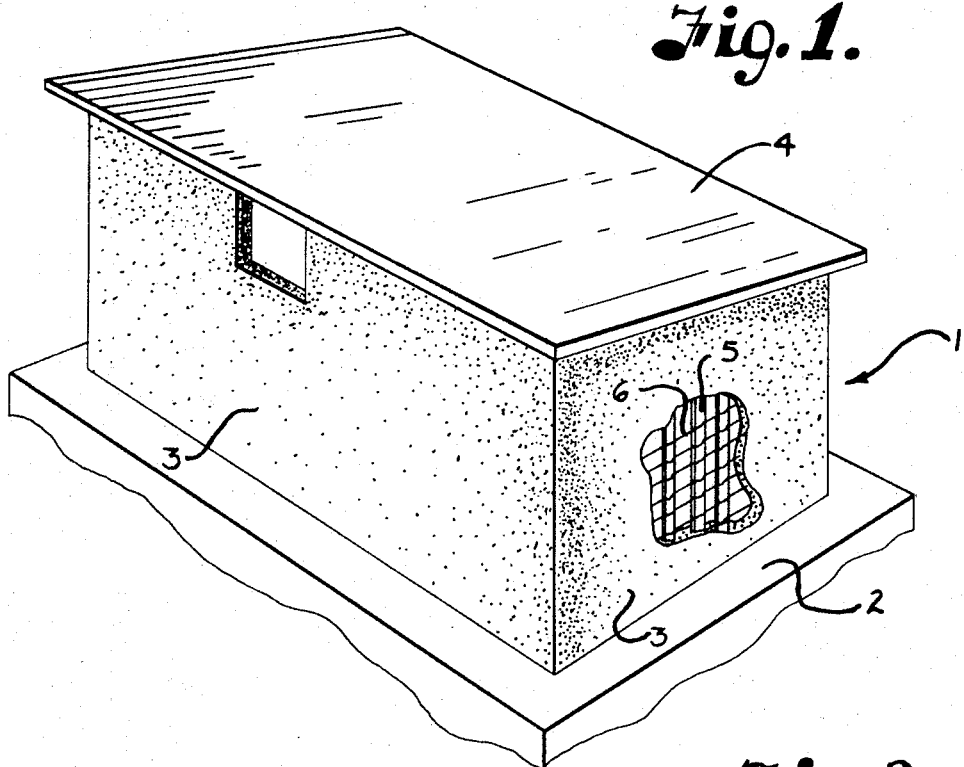
FIG. 1 is a perspective view of a grain storage structure having grain therein protected by walls formed according to the present invention.

Referring more in detail to the drawings:

The reference numeral 1 generally designates a grain storage structure, such as a corn crib having a suitable floor 2 with walls 3 extending upwardly therefrom. The grain storage structure 1 may have a roof 4 mounted thereon to protect grain stored therein.

A wall for the grain storage structure 1 may be formed by arranging reinforcing material to define a position for the wall and placing an oxychloride cementitious composition, formed as later described, on the reinforcing material to define the wall structure. The reinforcing material is preferably a mesh, such as having vertical bars 5 and horizontal wires 6.

In accordance with the present invention, generally stated, a cementitious composition is provided which is characterized by having sufficient porosity to permit air movement therethrough and thereby prevent formation of condensation resulting from rapid temperature drops outside the grain storage structure 1 and the composition is also characterized by inhibiting growth of mold.

The composition is light-weight, efficient, easily applied, and highly durable in the form of a new wall structure or a coating on the existing walls of an existing crib. The materials of the invention comprises an oxychloride cementitious composition containing a closely controlled mixture of dry materials, including magnesium chloride; magnesium oxide; asbestos fibers; a particle waterproofing agent; mineral filler, such as a very fine sand; and granular material, such as silica sand with sufficient water to form a plastic cementitious composition of a consistency adapted to be spread onto and adhered to reinforcing material or surfaces of existing walls of existing cribs. The composition is rigid when cured.

The composition of this invention is a mixture of dry materials and sufficient water to form a plastic mass which is applied to reinforcing materials to form a wall structure or a coating for surfaces of existing walls of existing cribs. The cementitious composition is hydraulic setting and requires no separate finish coat and is waterproof and will continue to protect the contents of the grain storage bin or crib.

The dry materials of the present invention are preferably contained in separate packages, except that the mineral filler and granular material may be in bulk form. Sufficient water is mixed with the dry materials from the separate packages and the mineral filler and granular material to form a homogeneous plastic mass just prior to application thereof.

It is preferred that a first container or package have only dry magnesium chloride ($MgCl_2$) therein. It is preferred that a second container or package have therein a mixture of selected dry materials, preferably magnesium oxide (MgO), asbestos fibers, a particle waterproofing agent and a whitening agent when desired. Calcium sterate may be included in the second package or container to act as the particle waterproofing agent. The proportions of the dry materials of this invention must be carefully controlled. The weight of the magnesium chloride (MgCl$_2$) should be between 15 percent and 30 percent of the total weight of the dry materials including the mineral filler and granular material. The remaining weight of dry materials should be divided as follows:

| Material | Percent |
| --- | --- |
| Magnesium Oxide (MgO) | 15–30 |
| Asbestos Fibers | 1.0–10.0 |
| Particle Waterproofing Agent | 1.0–5.0 |
| Mineral Filler | 5–30 |
| Granular Material | 15–50 |

The above listed quantities are by weight before adding water to form a plastic composition.

The following examples have been found to form a particularly useful cementitious composition for use in forming crib or bin wall structures to protect grain therein.

EXAMPLE 1

| Magnesium Chloride | 20.20% |
| --- | --- |
| Magnesium Oxide | 20.20% |
| Asbestos Fibers | 3.88% |
| Calcium Sterate | 1.53% |
| Titanium Dioxide | 0.76% |
| Mineral Filler | 9.33% |
| Granular Material | 44.10% |

EXAMPLE 2

| Magnesium Chloride | 20.25% |
| --- | --- |
| Magnesium Oxide | 20.25% |
| Asbestos Fibers | 3.97% |
| Calcium Sterate | 1.57% |
| Mineral Filler | 9.45% |
| Granular Material | 44.51% |

The chemical salts in the composition formed according to Examples 1 and 2 tend to keep out and inhibit the growth of mold or other micro-organisms both on the walls of the grain storage bin and on grain in contact with and adjacent the composition. The granular material in the composition provides body and creates a porous material which allows a breathing action in walls formed of the composition. Air moving in contact with and air moving through a wall formed of the oxychloride cementitious composition contacts the chemical salts and then the grain whereby the air movement inhibits the growth of mold and other micro-organisms.

Moisture is present in the air in grain storage bins and a rapid reduction in temperature outside the bin would result in condensation being formed on bin surfaces and on grain stored therein, therefore, it is extremely desirable to prevent a wide temperature difference on opposite sides of walls defining the bin. The porous structure of the composition permits breathing and allows a slow change of temperature in the bin to thereby prevent a wide variation in temperature on opposite sides of walls enclosing the grain storage bins.

It is noted that the magnesium chloride is maintained in a dry condition preferably within a first container or package (not shown) and the magnesium oxide, asbestos fibers, calcium sterate and titanium dioxide (when present) are maintained in a dry condition, preferably in a second container or package (not shown). The contents of the first and second package are mixed with the mineral filler and granular material and with sufficient clean water to form a plastic oxychloride cementitious composition which is rigid when cured. Water temperature for mixing should be (40°F.) forty degrees Fahrenheit or above and it is preferred that the exterior temperatures should not be below freezing during application of the resulting plastic composition to form a wall structure or to form a coating on an existing wall of an existing grain storage bin or crib.

Calcium stearate has been found to be an effective particle waterproofing agent. It is believed that calcium sterate waterproofs the particles in the composition during the particles of the composition against weathering.

It has been found that calcium stearate retains water in the oxychloride cementitious composition during a curing cycle and the calcium sterate gives added strength to walls formed of the composition by preventing checking or cracking. It is also believed that calcium stearate reduces porosity to substantially prevent water from entering the cementitious material after same has been cured, however, sufficient porosity to permit air movement through the composition is desired, therefore, a carefully controlled quantity of granular material is added during mixing of dry materials to form the composition.

Asbestos fibers have been found to increase tensile strength and flexibility of the composition even when large quantities of mineral filler and granular material are present, to thereby balance the hardness of the cured material.

The material filler is preferably a very fine sand, such as that passing a No. 200 sieve, and it has been found that excessive amounts of the very fine sand result in a product which is not water-tight and which is brittle and too porous. Therefore, it is preferred that the mineral filler or very fine sand be not more than twice the quantity of the magnesium oxide.

It is also preferred that the granular material be a well graded silica sand, such as material passing through a No. 4 sieve and retained on a No. 200 sieve, to provide body and porosity for the wall structure. It is important that the quantity of granular material or sand to the total dry materials be such that there is sufficient sand to provide sufficient body but not enough to cause the wall structure formed thereof to be more porous than necessary for the desired breathing action, therefore, it is recommended that the granular material or sand be not more than four times the quantity of the magnesium oxide.

When an ornamental effect is desired, a whitening agent, such as titanium dioxide (TiO$_2$), is included in the second package. Colors other than white may be obtained by mixing a suitable dye of the desired color with the dry materials and water.

Many existing cribs have walls formed of material which is ideally suited to function as reinforcing members when an oxychloride cementitious composition, formed as previously described, is placed thereon to form an improved wall structure, for example, a wall formed of the mesh having longitudinally spaced vertically extending bars or slats 5 tied together by a plurality of vertically spaced horizontal wires 6 each wound around the bars or slats 5.

Figure 3:
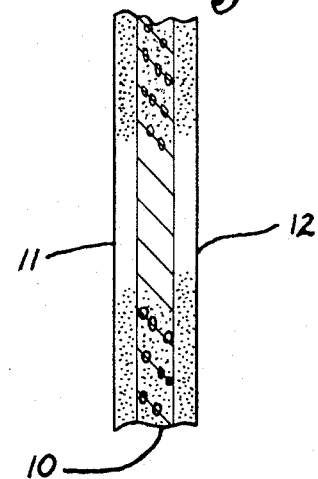
FIG. 3 is a sectional view of a modified wall structure wherein an oxychloride cementitious composition is in place on an existing wall structure.
Figure 2:
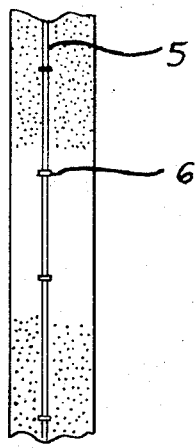
FIG. 2 is a sectional view of a wall structure embodying features of the present invention and showing an oxychloride cementitious composition in place on reinforcing material.

FIG. 3 illustrates an existing wall structure 10 having coatings 11 and 12 of oxychloride cementitious composition on opposite sides thereof, with the coatings being prepared as previously described.

When the oxychloride cementitious composition is applied to the existing wall 10 in the form of the coatings 11 and 12, the desirable qualities of porosity, preventing growth of mold, light-weight, strong, weather resistant, breathing and the like are provided for the wall structure so formed.

It is to be understood that while I have illustrated and described certain forms of my invention, it is not to be limited to these specific forms or arrangement of parts herein described and shown.

What I claim and desire to secure by Letters Patent is:

1. A method of protecting grain in storage areas comprising:
   a. confining grain within an enclosed storage area having certain rigid walls of an oxychloride cementitious composition of magnesium chloride, magnesium oxide, asbestos and a particle waterproofing agent, said walls being characterized by a porosity that excludes water, rain and the like and permits air movement therethrough;
   b. said wall porosity permitting air movement into and out of said enclosed storage area (through said porous walls) to prevent formation of condensation within said storage area during rapid temperature drop outside of the enclosed storage area;
   c. said air entering said enclosed area passing through said porous wall in contact with chemical salts in the cementitious composition of the walls and inhibiting growth of mold within the storage area.

2. The method of protecting grain in a storage area as set forth in claim 1 wherein:
   a. said magnesium chloride and magnesium oxide are present in the cementious composition in substantially equal quantities;
   b. said cementious composition including granular material in a ratio of one to four times the quantity of the magnesium oxide, and mineral filler in the ratio of 40 percent to 200 percent of the quantity of the magnesium oxide.

3. The method of protecting grain in a storage area as set forth in claim 2 wherein:
   a. said magnesium chloride is fifteen percent to 30 percent of the total weight of dry materials;
   b. said magnesium oxide is fifteen percent to 30 percent of the total weight of dry materials;
   c. said particle waterproofing agent is calcium sterate and calcium sterate is one percent to 5 percent of the total weight of dry materials; and
   d. said asbestos is one percent to 10 percent of the total weight of dry materials.

* * * * *